(12) United States Patent
Saenger Nayver et al.

(10) Patent No.: US 12,135,490 B2
(45) Date of Patent: Nov. 5, 2024

(54) REARVIEW ASSEMBLY INCORPORATING HIGH-TRANSMITTANCE NIR FILM

(71) Applicant: Gentex Corporation, Zeeland, MI (US)

(72) Inventors: Mario F. Saenger Nayver, Zeeland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 105 days.

(21) Appl. No.: 18/098,267

(22) Filed: Jan. 18, 2023

(65) Prior Publication Data

US 2023/0229052 A1 Jul. 20, 2023

Related U.S. Application Data

(60) Provisional application No. 63/300,782, filed on Jan. 19, 2022.

(51) Int. Cl.
| | |
|---|---|
| *G06V 10/143* | (2022.01) |
| *B60R 1/04* | (2006.01) |
| *B60R 1/12* | (2006.01) |
| *G02F 1/157* | (2006.01) |
| *G02F 1/163* | (2006.01) |
| *G06V 10/145* | (2022.01) |

(Continued)

(52) U.S. Cl.
CPC ............ *G02F 1/163* (2013.01); *B60R 1/04* (2013.01); *B60R 1/12* (2013.01); *G02F 1/157* (2013.01); *G06V 10/143* (2022.01); *G06V 10/145* (2022.01); *G06V 20/59* (2022.01); *G06V 40/19* (2022.01); *G06V 40/197* (2022.01); *H04N 23/56* (2023.01); *B60R 2001/1223* (2013.01); *B60R 2001/1253* (2013.01); *G02F 2203/09* (2013.01); *G02F 2203/11* (2013.01); *H04N 23/11* (2023.01)

(58) Field of Classification Search
CPC .................................................. G06V 10/143
See application file for complete search history.

(56) References Cited

U.S. PATENT DOCUMENTS

| | | | |
|---|---|---|---|
| 5,422,756 | A | 6/1995 | Weber |
| 5,631,089 | A | 5/1997 | Center, Jr. et al. |

(Continued)

FOREIGN PATENT DOCUMENTS

| | | |
|---|---|---|
| CN | 214299895 U | 9/2021 |
| JP | 2016167189 A | 9/2016 |

(Continued)

*Primary Examiner* — Young Lee
(74) *Attorney, Agent, or Firm* — Price Heneveld LLP; Brian James Brewer

(57) ABSTRACT

A rearview assembly includes an electrochromic element. The electrochromic element includes a first substrate including a first surface and a second surface. The electrochromic element further includes a second substrate comprising a third surface and a fourth surface. The first substrate and the second substrate form a cavity. The electrochromic element includes an electrochromic medium contained in the cavity. The rearview assembly includes an image sensor directed toward the fourth surface and configured to capture near-infrared light reflected from an object and projected through the electrochromic element. The rearview assembly includes a transflective film disposed adjacent to the fourth surface having a near-infrared light transmission level and a visible light reflectance level.

10 Claims, 5 Drawing Sheets

(51) Int. Cl.
*G06V 20/59* (2022.01)
*G06V 40/18* (2022.01)
*G06V 40/19* (2022.01)
*H04N 23/56* (2023.01)
*H04N 23/11* (2023.01)

(56) References Cited

U.S. PATENT DOCUMENTS

| | | |
|---|---|---|
| 5,928,572 A | 7/1999 | Tonar et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,137,620 A | 10/2000 | Guarr et al. |
| 6,141,137 A | 10/2000 | Byker et al. |
| 6,193,912 B1 | 2/2001 | Thieste et al. |
| 6,241,916 B1 | 6/2001 | Claussen et al. |
| 6,249,369 B1 | 6/2001 | Theiste et al. |
| 6,519,072 B2 | 2/2003 | Nishikitani et al. |
| 6,572,233 B1 | 6/2003 | Northman et al. |
| 6,703,925 B2 | 3/2004 | Steffel |
| 8,201,800 B2 | 6/2012 | Filipiak |
| 8,210,695 B2 | 7/2012 | Roth et al. |
| 8,237,909 B2 | 8/2012 | Ostreko et al. |
| 8,264,761 B2 | 9/2012 | Cammenga et al. |
| 8,282,224 B2 | 10/2012 | Anderson et al. |
| 8,339,526 B2 | 12/2012 | Minikey, Jr. et al. |
| 8,411,245 B2 | 4/2013 | Lee et al. |
| 8,545,030 B2 | 10/2013 | Anderson et al. |
| 8,643,931 B2 | 2/2014 | Cammenga et al. |
| 8,646,924 B2 | 2/2014 | Roth et al. |
| 8,814,373 B2 | 8/2014 | Steel et al. |
| 8,827,517 B2 | 9/2014 | Cammenga et al. |
| 8,885,240 B2 | 11/2014 | Roth et al. |
| 8,925,891 B2 | 1/2015 | Van Huis et al. |
| 9,174,577 B2 | 11/2015 | Busscher et al. |
| 9,254,789 B2 | 2/2016 | Anderson et al. |
| 9,838,653 B2 | 12/2017 | Fish, Jr. et al. |
| 10,427,606 B2 | 10/2019 | Anderson et al. |
| 2012/0281268 A1 | 11/2012 | McCabe et al. |

FOREIGN PATENT DOCUMENTS

| | | |
|---|---|---|
| WO | 9842796 A1 | 10/1998 |
| WO | 9902621 A1 | 1/1999 |

REARVIEW ASSEMBLY INCORPORATING HIGH-TRANSMITTANCE NIR FILM

CROSS-REFERENCE TO RELATED APPLICATIONS

This application claims priority under 35 U.S.C. § 119(e) and the benefit of U.S. Provisional Application No. 63/300,782 entitled REARVIEW ASSEMBLY INCORPORATING HIGH-TRANSMITTANCE NIR FILM, filed on Jan. 19, 2022, by Saenger Nayver et al., the entire disclosure of which is incorporated herein by reference.

TECHNOLOGICAL FIELD

The present invention generally relates to a rearview assembly, and more particularly, to a transflective rearview assembly with improved near-infrared transmittance.

SUMMARY OF THE DISCLOSURE

According to one aspect of the present disclosure, a rearview assembly is disclosed. The rearview assembly includes an electrochromic element. The electrochromic element includes a first substrate including a first surface and a second surface. The electrochromic element further includes a second substrate comprising a third surface and a fourth surface. The first substrate and the second substrate form a cavity. The electrochromic element includes an electrochromic medium contained in the cavity. The rearview assembly includes an image sensor directed toward the fourth surface and configured to capture near-infrared light reflected off of an object and projected through the electrochromic element. The rearview assembly includes a transflective film disposed adjacent to the fourth surface having a near-infrared light transmission level and a visible light reflectance level. The near-infrared light transmission level is at least 50%.

According to another aspect of the present disclosure, a scanning apparatus for a vehicle is disclosed. The scanning apparatus includes an electrochromic element. The electrochromic element includes a first substrate including a first surface and a second surface. The electrochromic element further includes a second substrate comprising a third surface and a fourth surface. The first substrate and the second substrate form a cavity. The electrochromic element includes an electrochromic medium contained in the cavity. The scanning apparatus includes an image sensor directed toward the fourth surface and configured to capture near-infrared light reflected off of an eye of a passenger of the vehicle and projected through the electrochromic element. The scanning apparatus includes a transflective film disposed adjacent to the fourth surface having a near-infrared light transmission level of about 90%. The scanning apparatus includes a controller in communication with the image sensor and configured to determine an identity of the passenger based on the near-infrared light.

These and other features, advantages, and objects of the present invention will be further understood and appreciated by those skilled in the art by reference to the following specification, claims, and appended drawings.

DETAILED DESCRIPTION

Figure 1:
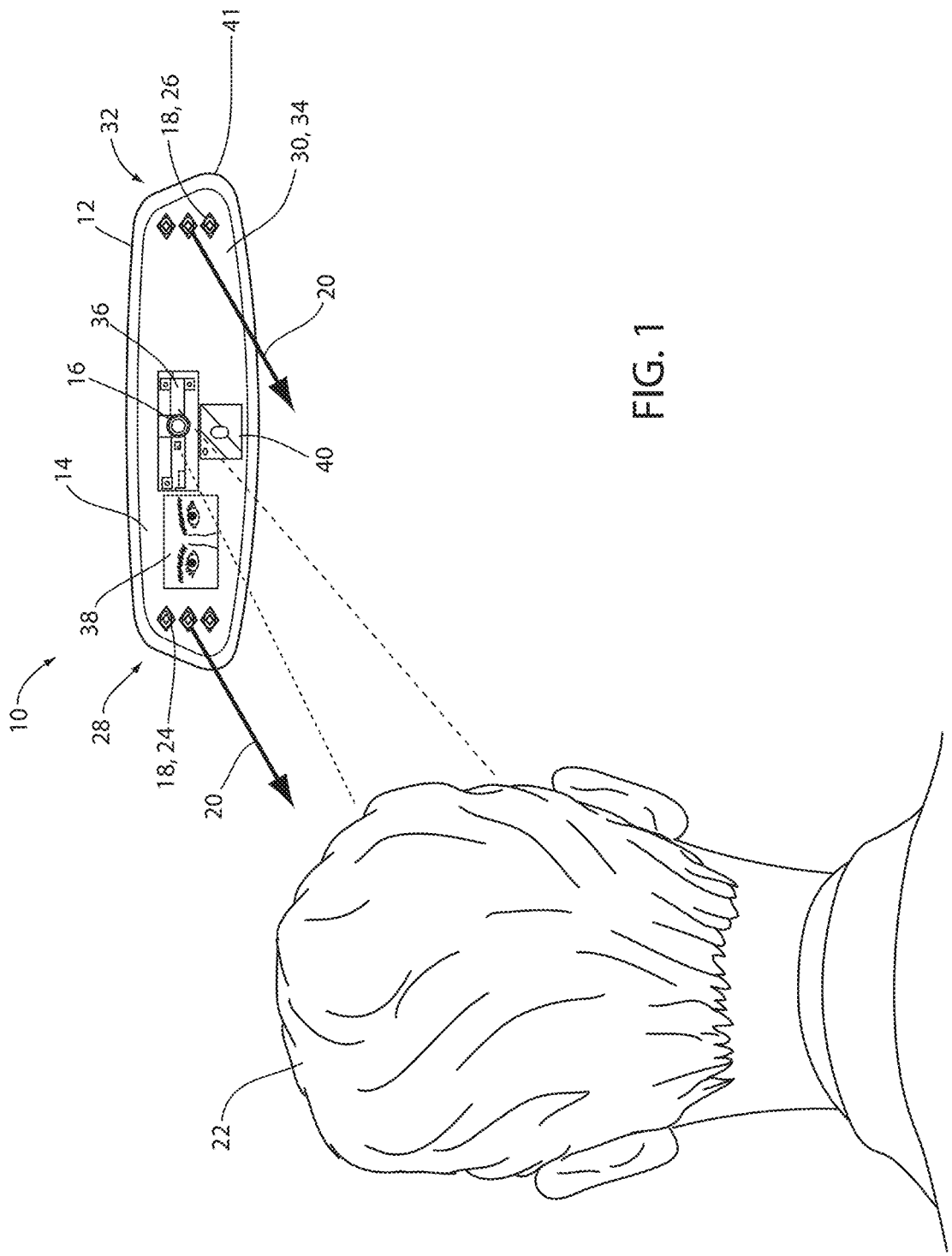
FIG. 1 is an illustrative view of a mirror assembly comprising a scanning apparatus.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The terms "substantially," "about," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially," "about," etc. may denote values within about 10% of each other, such as within about 5% of each other, or within about 2% of each other.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The present disclosure may provide for an improved monitoring apparatus for a vehicle cabin. The monitoring apparatus may be incorporated with an interior rearview mirror assembly to allow a camera of the monitoring apparatus to capture a field of view that includes front and rear compartments of the cabin. In this way, the monitoring apparatus may serve as a cabin-monitoring system that may detect various events taking place in the cabin of the vehicle and/or a driver-monitoring system that may detect the identity or attentiveness of the driver. The camera and other features of the monitoring apparatus may be disposed behind one or more layers of the interior rearview mirror assembly. One advantage of the monitoring system may be a reduced cost due to inclusion of a transflective polymer disposed in front of the camera. For example, the transflective polymer may provide for a high transmission of infrared light and a high reflectance of visible light. In this way, the number of infrared light sources employed behind the transflective polymer to illuminate the cabin may be reduced.

Figure 2:
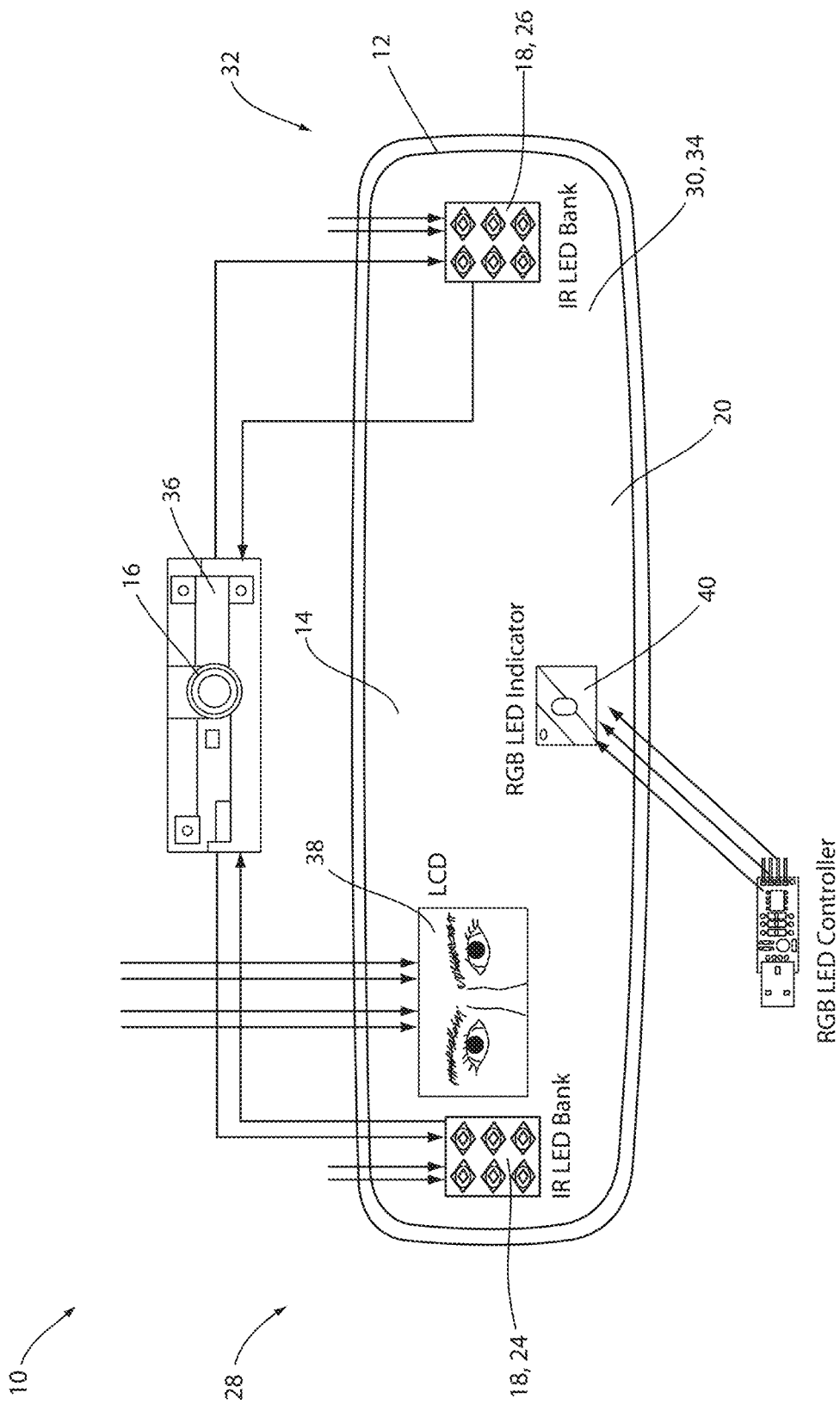
FIG. 2 is a schematic view of a mirror assembly comprising a scanning apparatus.

Referring to FIGS. 1 and 2, the disclosure provides for a scanning apparatus 10 incorporated with an interior rearview mirror assembly 12 for an automotive vehicle. The mirror assembly 12 may correspond to an electro-optic assembly 14 having an electrochromic (EC) mirror element. The scanning apparatus 10 may be operable to perform an identification function and/or various cabin-monitoring functions. The identification function may correspond to an eye-scan-identification function. In this configuration, the scanning apparatus 10 may provide for an interior rearview mirror assembly 12 configured to identify an operator of a vehicle based on the eye-scan identification function. The cabin-monitoring functions may be configured to identify a distraction condition of a driver, alertness level of the driver, and other conditions that may affect the focus of the driver.

The eye-scan-identification function may utilize an infrared illumination of an iris of an eye in order to illuminate the eye for the identification. Such illumination may be optimized in conditions allowing for a high optical transmittance in the near-infrared (NIR) range. In some embodiments, the disclosure may provide for an electrochromic (EC) stack of the electro-optic assembly that may have a high transmittance of wavelengths of light in the NIR range, for example, wavelengths of light ranging from 750 nm to 2500 nm, 780 nm to 1200 nm, or from approximately 800 nm to 940 nm. Additionally, in some implementations, the electro-optic assembly may comprise a plurality of light sources configured to illuminate at least one iris of the operator of the vehicle.

To provide for the eye-scan-identification function, for example an iris scan, an image sensor 16 may be disposed proximate a rear surface of the electro-optic assembly. Further details regarding the relationship of the surfaces of the electro-optic assembly are discussed in reference to FIG. 3. The image sensor 16 may correspond to, for example, a digital charge-coupled device (CCD) or complementary metal-oxide-semiconductor (CMOS) active pixel sensor, although may not be limited to these exemplary devices. The image sensor 16 may be configured to capture IR and visible images concurrently. The image sensor 16 may be in communication with at least one light source 18, which may correspond to one or more infrared emitters configured to output an emission 20 of light in the NIR range. In this configuration, the image sensor 16 may be configured to selectively activate the one or more infrared emitters corresponding to the at least one light source 18 to illuminate the iris such that an identity of an operator 22 of the vehicle may be determined.

The infrared emitters or the light sources 18 may correspond to a plurality of infrared emitter banks. Each of the infrared emitter banks may comprise a plurality of light emitting diodes, which may be grouped in a matrix or otherwise grouped and disposed behind a rear surface of the electro-optic device. In an exemplary embodiment, the plurality of light sources 18 may correspond to a first emitter bank 24 and a second emitter bank 26. The first emitter bank 24 may be configured to output the emission 20 in the NIR range from a first side portion 28 of a front surface 30 of the electro-optic assembly 14. The second emitter bank 26 may be configured to output the emission in the NIR range from a second side portion 32 of the front surface 30 of the electro-optic assembly 14, which may correspond to a mirror element 34 of the mirror assembly 12. In this configuration, the scanning apparatus 10 may be configured to illuminate the eyes of the operator 22 such that the image sensor 16 may capture image data including details of the irises of the eyes. For example, the light source 18 may be configured to illuminate the cabin of the vehicle with NIR wavelengths at or near 810 nm, 940 nm, and/or 1550 nm.

In an exemplary embodiment, each of the first emitter bank 24 and/or the second emitter bank 26 may correspond to more or fewer LEDs or banks of LEDs. In some embodiments comprising an electro-optic assembly 14 having a high level of transmittance in the NIR range, the scanning apparatus 10 may utilize fewer or less intense LEDs. Examples of electro-optic assemblies having a high level of transmittance in the NIR range may correspond to assemblies comprising a transflective dielectric coating disposed on a fourth surface of the electro-optic assembly as further disclosed herein. In some embodiments, the light source 18 may include vertical cavity surface emitting lasers (VCSEL's operable to project light in the NIR range). This may provide a light source 18 with a greater on axis power in relation to the LED, such that the usable optical power from the VCSEL may be greater than the LEDs at a lower current, with a narrower or more focused beam angle than the LED.

The image sensor 16 may be disposed on a circuit 36 (e.g., a printed circuit board) in communication with a controller. The controller may further be in communication with various devices that may be incorporated in the vehicle via the communication bus or any other suitable communication interface. The controller may correspond to one of more processors or circuits, which may be configured to process image data received from the image sensor 16. In this configuration, the image data may be communicated from the image sensor 16 to the controller. The controller may process the image data with one or more algorithms configured to determine an identity of the operator of the vehicle. Further detailed discussion of the controller and the various devices that may be in communication therewith are discussed in reference to FIG. 4.

The controller may further be in communication with a display 38. The display 38 may be disposed in the mirror assembly 12 behind the rear surface. The controller may be operable to display the image data received from the image sensor 16 such that the operator 22 may view the image data. In this configuration, the operator 22 may adjust a position of the eyes shown on the display 38 to position the eyes such that the image data may include the necessary features required to identify the operator 22. In an exemplary embodiment, the features required to identify the operator 22 of the vehicle may correspond to features of the eyes of the operator 22 (e.g., the irises).

The display 38 may correspond to a partial or full display configured to display an image data through at least a portion of the mirror assembly 12. The display 38 may be constructed utilizing various technologies, for example LCD, LED, OLED, plasma, DLP, or other display technology. Examples of display assemblies that may be utilized with the disclosure may include U.S. Pat. No. 6,572,233 "Rearview Mirror with Display," U.S. Pat. No. 8,237,909 entitled "Vehicular Rearview Mirror Assembly Including Integrated Backlighting for a Liquid Crystal Display (LCD)," U.S. Pat. No. 8,411,245 "Multi-Display Mirror System and Method for Expanded View Around a Vehicle," and U.S. Pat. No. 8,339,526 "Vehicle Rearview Mirror Assembly Including a High Intensity Display," which are incorporated herein by reference in their entirety.

The scanning apparatus 10 may further comprise an indicator 40 in the mirror assembly 12. The indicator 40 may be in communication with the controller and configured to output a signal to identify a state of the scanning apparatus 10 and/or a rearview camera as discussed in reference to FIG. 4. The indicator 40 may correspond to a light source that may be operable to flash and/or change colors to communicate a state of the scanning apparatus 10. The indicator 40 may correspond to a light emitting diode (LED), and in an exemplary embodiment, the indicator 40 may correspond to a red, green, and blue (RGB) LED operable to identify the state of the scanning apparatus 10 by outputting one or more colored emissions of light.

The various components of the electro-optic assembly 14 and the scanning apparatus 10 may be contained within a housing 41 of the mirror assembly 12. In this way, the various components discussed herein may be substantially hidden from a view of the operator 22. Accordingly, the disclosure may provide for various advanced functions from the electro-optic assembly 14 and the scanning apparatus 10 while maintaining an appearance of a conventional rearview mirror.

Figure 3:
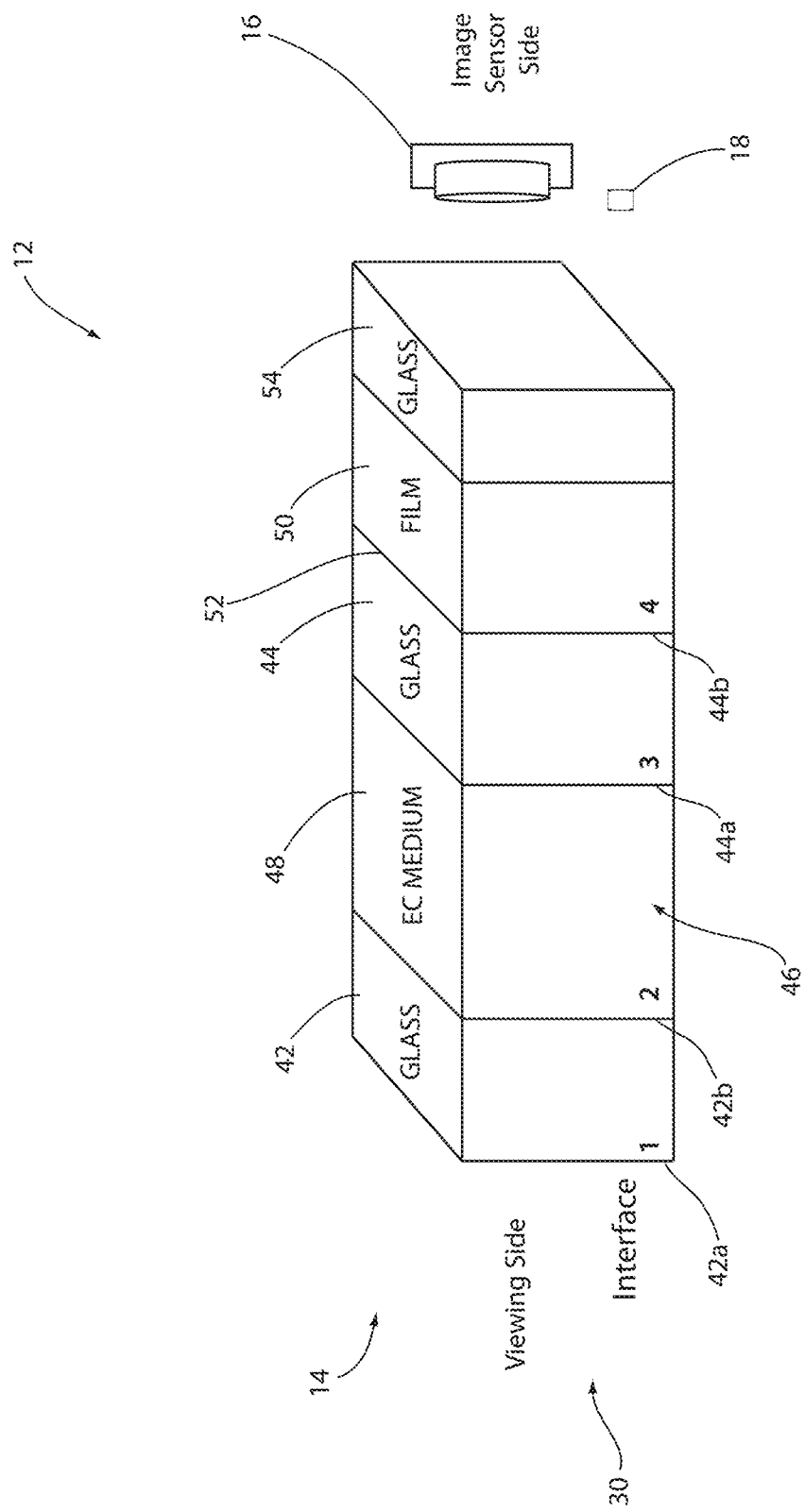
FIG. 3 is a cross-sectional view of an electro-optic assembly of the mirror assembly.

Referring to FIG. 3, a cross-sectional view of the mirror assembly 12 incorporating an electro-optic assembly 14 is shown. The electro-optic assembly 14 may be partially reflective and partially transmissive and comprise the mirror element 34. The mirror element 34 may include a first substrate 42 having a first surface 42a and a second surface 42b. The mirror element 34 may further comprise a second substrate 44 having a third surface 44a and a fourth surface 44b. The first substrate 42 and the second substrate 44 may define a cavity 46 and may be substantially parallel. The first surface 42a and the third surface 44a may be oriented toward the front surface 30 of the mirror assembly 12. The second surface 42b and the fourth surface 44b may be oriented toward a rear surface of the mirror assembly 12 or the housing 41 of the mirror assembly 12. In this configuration, the contents of the housing 41, including the image sensor 16 and the light source 18, may be significantly hidden from view by the electro-optic assembly 14.

Though described as being disposed behind the electro-optic assembly 14, in some embodiments, the infrared emitters or the light source 18 may otherwise be attached to or disposed with the housing 41. Additionally, the at least one light source 18 may be remotely located relative to the mirror assembly 12. In such embodiments, the light source 18 may be in communication with a controller of the scanning apparatus 10. In the various embodiments, the light source 18 may be configured to project the emission 20 of light in the NIR range such that the image sensor 16 may receive light reflected from a subject of the scanning apparatus 10 (e.g. a passenger or operator). Accordingly, the scanning apparatus 10 may be utilized to suit a variety of applications without departing from the spirit of the disclosure.

The cavity 46 may contain an electro-optic medium 48, such as, but not limited to, an electrochromic medium. The cavity 46 may be completely or partially filled with the medium 48. The mirror assembly 12 may be in communication with a dimming controller via electrical contacts and may comprise various seals to retain the medium 48 in the cavity 46. In this configuration, the mirror assembly 12 may correspond to an electrochromic mirror element configured to vary in reflectivity in response to a control signal received from the dimming controller via the electrical contacts. The control signal may change an electrical potential supplied to the mirror assembly 12 to control the reflectivity.

Each of the surfaces 42a, 42b, 44a, and 44b correspond to interfaces of the mirror assembly 12. The first surface 42a corresponds to a first interface 1. The second surface 42b corresponds to a second interface 2. The third surface 44a corresponds to a third interface 3, and the fourth surface 44b corresponds to a fourth interface 4. In some electro-optic assemblies, a metallic transflective coating may be disposed on the third interface 3 or the fourth interface 4. The transflective coating may comprise a layer containing silver and/or other metals, a dielectric, and/or transparent conducting oxides. Because metals may tend to have a high degree of reflectance in the NIR range, incorporating a metallic transflective coating may prevent enough NIR light from penetrating the transflective coating to attain quality image data, thereby inhibiting imaging and illumination from occurring behind the metallic transflective coating.

With continued reference to FIG. 3, a polymer-based transflective film 50 may be incorporated with the mirror assembly 12 to provide sufficient NIR transmission and visible light reflection. The polymer-based transflective film 50 may be disposed on the fourth surface 44b and coupled with the fourth surface 44b via lamination with the glass substrate 44. The film 50 may be extruded, molded, or fabricated using other similar methods. The film 50 may comprise a single layer (such as a layer of a low-density polyethylene, see, e.g., U.S. Pat. No. 5,631,089) or be a multi-layer film stack (such as a stack of alternating layers having high- and low-refractive indices). Some of the layers of the multi-film stack may be optically anisotropic (e.g., birefringent). As such, the film 50 may be referred to as an anisotropic polymer-based film (APBF) and may serve as a dielectric coating for the mirror assembly 12. The APBF 50 employed with the mirror assembly 12 may include any type of material incorporated with the anisotropic film described in U.S. Pat. Nos. 9,254,789 and 10,427,606, which are hereby incorporated herein by reference.

The film 50 may contain commercially available plastics such as acrylics, polycarbonates, silicone, polyester, polysulfone, polycyclic olefin, PVC, or the like having nominal indices of refraction from about 1.3 to about 1.8. The stack of layers with alternating refractive indices may be used to enhance the reflectance of light having a given polarization while simultaneously optimizing the transmittance of light having another polarization state. Such anisotropic layers may include, in one embodiment, a prismatically microstructured surface similar to that disclosed in U.S. Pat. No. 5,422,756 that facilitates the separation of the incident light into two components having orthogonal polarizations. In some embodiments, the film 50 may include about 600 layers. It is generally contemplated that the film 50 may be dichroic.

The film 50 may comprise a plurality of alternating polymeric layers of at least two types having, respectively, high and low refractive indices at one polarization and different high and low refractive indices at an orthogonal polarization. One example of such film may incorporate alternating layers of crystalline naphthalene dicarboxylic acid polyester. In another example, the multilayer polymer film 50 may comprise a layer that has a spatially oriented structure realized, for example, by stretching an otherwise isotropic polymer film in a chosen direction. The stretching in a chosen direction may further allow the film 50, such as a polyester film, to operate as a depolarizer. In other examples, the film 50 may be a camouflaging film for concealing the light sources 18. In still other examples, the film may be a reflective polarizer mirror (RPM) film. The APBF 50 may include one or more dual brightness enhancement films by 3M, such as NITS-R, DBEF-Q, APF-25, APF-35, or APF-50.

In operation, the scanning apparatus 10 may be illuminate the operator 22 or a subject on the viewing side facing the front surface 30. The illumination from the scanning apparatus 10 may be provided as an emission of light from the light source 18 positioned behind the film 50 and the electro-optic assembly 14, which may pass outward through the film 50 and the electro-optic assembly 14. The reflected light from the subject (e.g., the vehicle operator 22) on the viewing side may be transmitted back through the electro-optic assembly 14. A high level of NIR light may be transmitted through the film 50. For example, the film 50 may provide about 90% NIR transmittance, such as when no electro-optic element is included with the mirror assembly 12. In other embodiments, the film 50 may provide for about 80% transmittance in the NIR range. In other embodiments, the NIR transmittance may be approximately 70%. The film 50 may attain a reflectance level comparable to industry standard, i.e., about 40% to 85%, or about 50% to 75%, or about 55% to 70%. Accordingly, the film 50 may provide for an NIR transmission level of about twice the visible light reflection level. For example, if the visible light reflectance level of the film 50 is approximately 35%, the NIR light transmission level may be in the range of 60% to 80%. If the visible light reflectance level of the film 50 is approximately 45%, the NIR light transmission may be in the range of 80% to 100%. Additionally, the dielectric coating can be designed to attain a neutral color appearance in the visible color range for a normal-incidence viewing angle up to a broad viewing angle. In this way, the disclosure provides for improved transmittance in the NIR range while maintaining visible color performance and mirror functionality.

In alternative configurations, the film 50 may provide the mirror assembly 12 with a high transmission (e.g., greater than 60%) of NIR light, mid-reflectance (e.g., 40% to 60%) of visible light, and a mid-transmission of visible light. In this configuration, the film 50 may be RPM film and allow for both infrared and visible light imaging for the imager 16. In another configuration, the film 50 may be a sensor camouflage film 50 with high transmission (e.g., greater than 60%) of NIR light, high reflectance (e.g., greater than 60%) of visible light, and low reflectance of visible light. In this configuration, the image sensor 16 may be a dual-function camera configured to capture infrared and visible light images. The image sensor 16 may be configured to capture adequate visible light for cabin-monitoring or identification functions when the visible light transmission level is as low as 30%.

According to some aspects of the present disclosure, a metallic transflective layer, or auxiliary layer 52, may be included between the fourth surface 44b and the film 50 to provide additional visible reflectance. As previously described, because the auxiliary layer 52 may be metallic, more light (both visible and IR/NIR) may be reflected than in embodiments not including the auxiliary layer 52. The auxiliary layer 52 may incorporate titanium oxide, niobium oxide, silicon oxide, tantalum oxide, aluminum oxide, etc. The auxiliary layer 52 may have a precise minimum thickness to increase the visible light reflectance to meet automotive reflectance requirements (e.g., 45%) while maintaining NIR light transmission in the range of about 70% to 95%. The mirror assembly 12 may further include a protective substrate layer, or third substrate 54, disposed adjacent the film 50. In this configuration, the film 50 may be laminated between the protective substrate layer 54 and the second substrate 44 to improve durability of the film 50. In some configurations, the auxiliary layer 52 and the film 50 may be disposed between the second substrate 44 and the third substrate 54.

Figure 4:
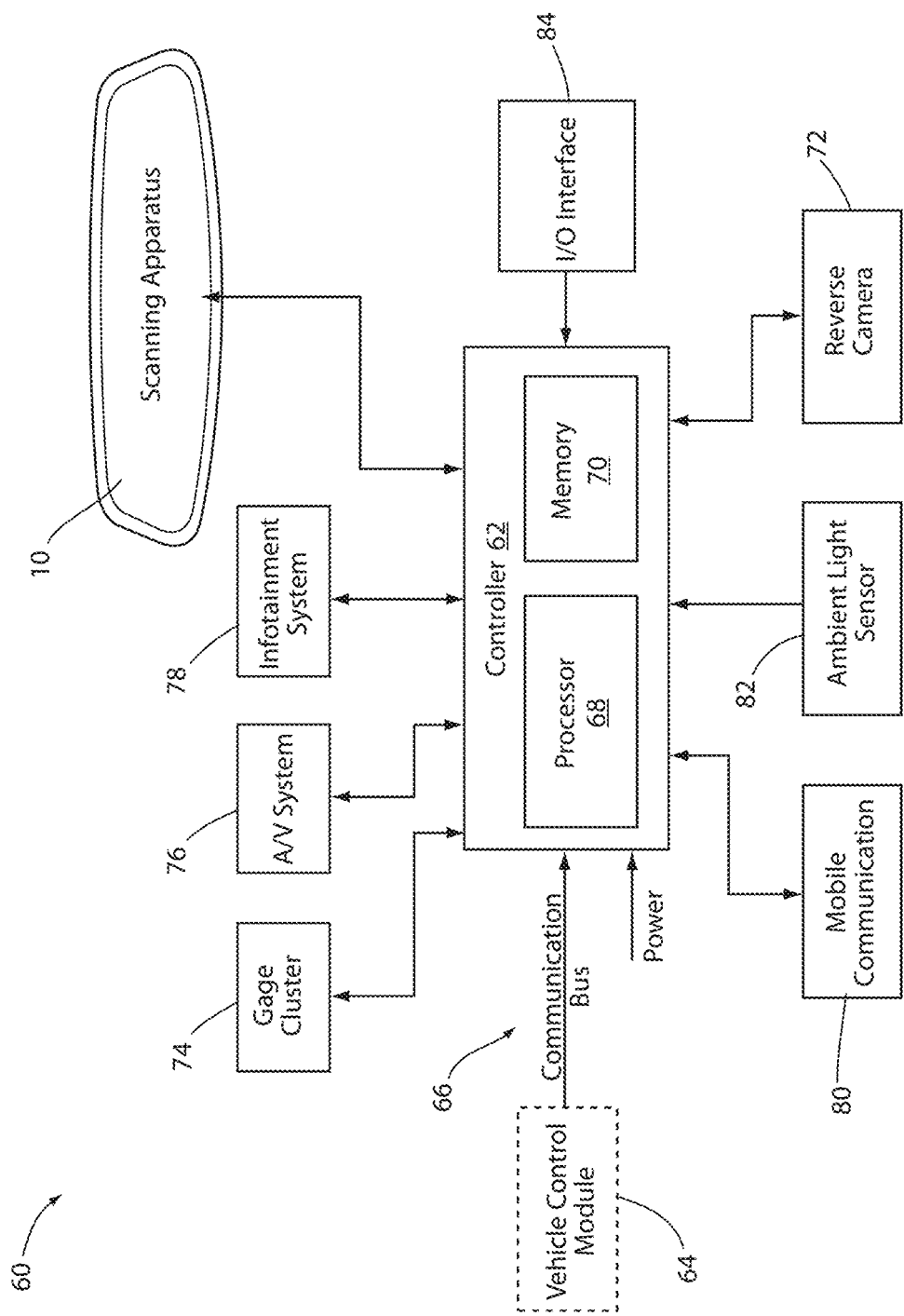
FIG. 4 is a block diagram of an identification system incorporating a scanning apparatus disposed in a mirror assembly.

Referring to FIG. 4, a block diagram of an identification system 60 incorporating the scanning apparatus 10 is shown. The controller 62 is shown in communication with the scanning apparatus 10 and may also be in communication with the vehicle control module 64 via a communication bus 66 of the vehicle. The communication bus 66 may be configured to deliver signals to the controller 62 identifying various vehicle states. For example, the communication bus 66 may be configured to communicate to the controller 62 a drive selection of the vehicle, an ignition state, a door open or ajar status, a remote activation of the scanning apparatus 10. Such information and control signals may be utilized by the controller 62 to activate or adjust various states and/or control schemes of the scanning apparatus 10 and/or the mirror assembly 12.

The controller 62 may comprise a processor 68 having one or more circuits configured to receive the signals from the communication bus 66 and control the scanning apparatus 10. The processor 68 may be in communication with a memory 70 configured to store instructions to control operations of the scanning apparatus 10. For example, the controller 62 may be configured to store one or more characteristics or profiles utilized by the controller 62 to identify the operator 22 of the vehicle. In this configuration, the controller 62 may communicate operating and identification information with the scanning apparatus 10 to identify the operator 22 of the vehicle. Additionally, based on the identification of the operator 22, the controller 62 may be configured to control and/or communicate with additional systems of the vehicle. Such systems may include a security system, speed governor, radio/infotainment system, etc. In this way, one or more systems of the vehicle may be controlled or restricted based on the identity of the operator.

In some embodiments in response to an identification of a passenger or operator 22 of the vehicle, the controller 62 may access a database of stored driver preferences to customize aspects of the vehicle or driver experience. For example, the controller 62 may access and enable radio station presets according to a driver's pre-established preferences. Navigation and/or map display settings may be changed or set according to a driver's pre-established preferences. Additionally, the database may comprise navigation information comprising known or previously visited locations. In particular, a route to home, work, or other frequently visited locations may be preset upon identification of a driver based on previous use or programming stored in the database.

The controller 62 may further be in communication with a reverse camera 72 or any other form of vehicle camera system. The controller 62 may receive image data from the reverse camera 72 corresponding to a rearward-directed field of view relative to the vehicle. In this configuration, the display 38 may provide for the rearward-directed field of view to be displayed when the display 38 is not utilized as for the identification process. The controller 62 may further be in communication with one or more of a gage cluster 74, an audio/video (A/V) system 76, an infotainment system 78, a media center, a vehicle computing system, and/or various other devices or systems of the vehicle. In various embodiments, the controller 62 may display image data from at least one of the image sensor 16 and the reverse camera 72 on the devices 74-78.

In an exemplary embodiment, the controller 62 may correspond to one of more processors or circuits. The controller 62 may be configured to process image data received from the image sensor 16. In this configuration, the controller 62 may process the image data with one or more algorithms configured to determine an identity of the operator of the vehicle. With the identity of the operator or one or more passengers of the vehicle identified, the controller 62 may further be operable to control various systems or functions of the vehicle.

For example, the controller 62 may be configured to authorize various setting or restrictions of settings for the vehicle based on an identification of the operator of the vehicle. The authorization may correspond to a speed governor, a payment authorization for toll roads or other transactional functions, a log of usage and timing for an identified operator, etc. In some implementations, the scanning apparatus may also be configured to document information corresponding to the usage and timing, for example, the number of passengers, a top speed of the vehicle, a maximum rate of acceleration, etc. In some embodiments, the controller 62 may further be in communication with a global position system (GPS) that may also provide regional restrictions for the operation of the vehicle.

In some embodiments, the controller 62 may utilize the identification of the operator 22 of the vehicle to report updates to an administrator of the vehicle. For example, in some embodiments, the controller 62 may further be in communication with a mobile communication system 80. The mobile communication system 80 may be configured to communicate via various mobile communication protocols. Wireless communication protocols may operate in accordance with communication standards including, but not limited to: Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multi-point distribution systems (LMDS); multi-channel-multi-point distribution systems (MMDS); RFID; and/or variations thereof. In this configuration, the controller 62 may be configured to send an alert or message to the administrator of the vehicle in response to one or more predetermined events. The alert or message may correspond to a text message, data message, email, alert via an application operating on a smart device, etc.

A predetermined event may correspond to a wide variety of events that may be identified by the controller 62 based on an identity of an operator of the vehicle. For example, the event may correspond to the vehicle crossing a geographic boundary, an ignition even identifying vehicle operation, operation at during a restricted usage timing (e.g., a time between midnight and 5 am), an identification of a number of passengers in the vehicle exceeding a limit, etc. In this configuration, the controller 62 may identify a restricted user of the vehicle via the scanning apparatus 10 and provide notifications to the administrator.

In some embodiments, the controller 62 may also report that an operator of the vehicle has not been identified. This may be due to a malfunction or a deliberate attempt to avoid identification from the scanning apparatus 10. In response to the operation of the vehicle without identification, the administrator of the vehicle may be notified via a message submitted from the mobile communication system 80 reporting unauthorized or otherwise unfavorable activity of the vehicle. In this configuration, the administrator of the vehicle may be notified of any form of restricted activity that may be identified by the controller 62 corresponding to a restricted or unidentified operator 22 of the vehicle.

The controller 62 may further be in communication with an ambient light sensor 82. The ambient light sensor 82 may be operable to communicate a light condition, for example a level of brightness or intensity of the ambient light proximate the vehicle. In response to the level of the ambient light, the controller 62 may be configured to adjust a light intensity output from the display. In this configuration, the operator of the controller may adjust the brightness of the display to provide image data captured by at least one of the image sensor 16 and the reverse camera 72.

The controller 62 may further be in communication with an interface 84 configured to receive one or more inputs configured to control at least one of the scanning apparatus 10 and the reverse camera 72. In some embodiments, the interface 84 may be combined with one or more devices of the vehicle. For example, the interface 84 may form a portion of the gage cluster 74, the A/V system 76, the infotainment system 78, a display console, and/or various input/output devices that may commonly be utilized in automotive vehicles (e.g., a steering switch, steering wheel controls, etc.). In this way, the disclosure provides for various control schemes for implementing the scanning apparatus 10 in a vehicle.

In some embodiments, the interface 84 may alternatively or additionally correspond to a keypad, fingerprint scanner, facial scanner, etc. In such configurations, the controller 62 may be operable to authenticate or identify a passenger or operator 22 of the vehicle based on a multi-factor identification process. For example, the controller 62 may be configured to identify an operator 22 or passenger of the vehicle in response to a first authentication and a second authentication. The first authentication may correspond to an iris scan detected via the scanning apparatus 10. The second authentication may correspond to a code or PIN entry into the keypad, a fingerprint scan via the fingerprint scanner, a facial scan via a camera or the scanning apparatus, etc. In this way, the disclosure may provide various levels of authentication for a variety of applications.

In general, the mirror element 34 may be an electrochromic element or an element such as a prism. One non-limiting example of an electro-chromic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same;" U.S. Pat. No. 5,998,617 entitled "Electrochromic Compounds;" U.S. Pat. No. 6,020,987 entitled "Electrochromic Medium Capable Of Producing A Pre-selected Color;" U.S. Pat. No. 6,037,471 entitled "Electrochromic Compounds;" U.S. Pat. No. 6,141,137 entitled "Electrochromic Media For Producing A Preselected Color;" U.S. Pat. No. 6,241,916 entitled "Electrochromic System;" U.S. Pat. No. 6,193,912 entitled "Near-Infrared-Absorbing Electrochromic Compounds And Devices Comprising Same;" U.S. Pat. No. 6,249,369 entitled "Coupled Electrochromic Compounds With Photostable Dication Oxidation States;" U.S. Pat. No. 6,137,620 entitled "Electrochromic Media With Concentration-Enhanced Stability, Process For The Preparation Thereof and Use In Electrochromic Devices;" U.S. Pat. No. 6,519,072, entitled "Electrochromic Device"; and International Patent Application Ser. Nos. PCT/US98/05570 entitled "Electrochromic Polymeric Solid Films, Manufacturing Electrochromic Devices Using Such Solid Films, And Processes For Making Such Solid Films And Devices," and PCT/EP98/03862 entitled "Electrochromic Polymer System," which are herein incorporated by reference in their entirety.

Figure 5:
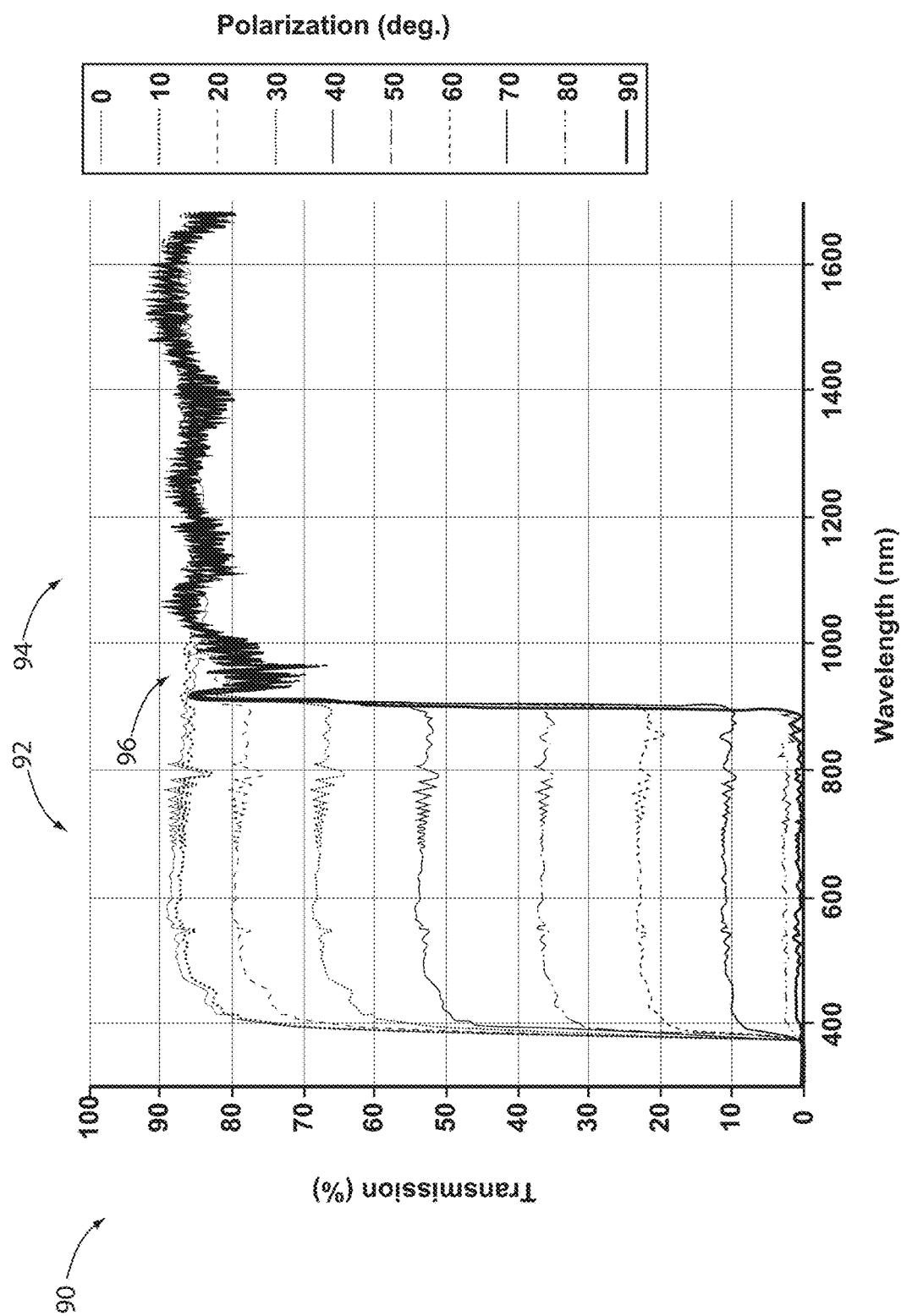
FIG. 5 is a plot demonstrating the transmittance of an exemplary film laminated to a substrate over a range of wavelengths and polarizations in accordance with the disclosure.

Referring now to FIG. 5, a plot 90 demonstrates the transmittance of an example of the film 50 laminated to the second substrate 44. As shown, the transmission percentage through the film 50 varies considerably based on two variables: the wavelength and the polarization of the light. As demonstrated by the different transmission level or percentage among the polarizations of the light, wavelengths of light in a first range 92 (e.g., approximately 380 nm to 870 nm) are transmitted at widely varied levels (e.g., approximately 0% to 90%) depending on the polarization of the light. The light transmitted in the first range 92 includes the visible range of wavelengths perceptible by humans, which is understood to range from approximately 380 nm to 700 nm. Accordingly, in the example shown, light in the visible range is reflected at a high level of reflectance converse to the transmission level shown ranging from 0% to 90% depending on the polarization of the light. As a result, the light in the visible range, within the first range 92, is reflected at an effective rate of at least 45% and in some cases greater than 60%. In effect, the reflectance of the film 50 may provide for a highly reflective, mirrored surface for light in the visible range. It shall be understood that the specific polarizations of visible light may be varied based on the nature of the film 50 laminated on the substrate 44. For example, in some examples, the visible light may not be significantly filtered by a stacked film. Accordingly, transmittance of the film 50 may not be limited to the specific examples provided.

In the case of longer wavelengths of light demonstrated in a second range 94, the film 50 may provide for a high level of transmission that is consistently transmitted through the film 50 independent of the polarization of the light. In the example, the second range 94 may be from approximately 870 nm to 1700 nm. The second range 94 of wavelengths may be within the near-infrared range of wavelengths, which may be understood to include wavelengths exceeding 780 nm and including lengths of approximately up to 2000 nm. Over the second range, FIG. 5 demonstrates that the transmission level of the light is nearly independent of the polarization and exceeds 65% for all of the included wavelengths. In this configuration, the emission output from the light source 18 associated with the scanning apparatus 10 may be transmitted within the second range 94 and within the near-infrared range to provide two primary benefits. First, the light in the second range 94 is outside the perception associated with typical human visual perception, such that the emission of the light from the light source 18 may be nearly or completely imperceptible to the subject 22. Additionally, the emission from the light source 18 may be at a wavelength within the second range 94, ensuring that the light is transmitted through the film 50 and the substrate 44 at a transmission level greater than 40%, 50%, 60%, and 65% regardless of the polarization of specific length with the second range 94. Finally, in some cases, the film 50 may be tuned and/or the wavelength of light emitted from the light source 18 may be selected to correspond to a level of transmission greater than 70%, 80%, or even 85% depending on the specific wavelength. For example, wavelengths of light illustrated in the example shown in FIG. 5 may exceed 75% and approximately 80% transmission for wavelengths at approximately 900 nm as well as wavelengths ranging from 1010 nm to approximately 1650 nm. Accordingly, in cases where the emission associated with the light source 18 is approximately 900 nm or in excess of 1010 nm, the transmission may be greater than at least 75%.

When reviewing the second range 94 of wavelengths in greater detail, an intermediate range 96 is apparent from approximately 920 nm to 1000 nm. Over this range, the transmission of light may be somewhat dependent on the polarization but to a lesser extent than wavelengths in the visible range as previously discussed. Accordingly, if the emission from light source 18 is aligned with a polarization having a particularly high transmission rate over the intermediate range 96, the transmission may similarly exceed 75% and range to approximately 80% or even 85%. The polarization of the light from the light source may be controlled or filtered based on the type of emitter implemented to target the wavelength and polarizations associated with the higher or increased transmission level within the intermediate range (e.g., polarizations from 0 deg. to 20 deg.) to maximize the transmission of the light output from the light source 18 and consequently maximize the illumination of the subject 22. The polarization of the light output from the light source 18 may similarly be manipulated or controlled over the second range 94 outside the intermediate range 96 but with less improvement in the transmission level based on the increasing independence of the transmission to polarization.

The present disclosure may be used with a mounting system, such as that described in U.S. Pat. Nos. 9,838,653; 9,174,577; 8,925,891; 8,814,373; 8,210,695; and 8,201,800; and U.S. Provisional Patent Application Nos. 61/709,716; 61/707,676; and 61/704,869, which are hereby incorporated herein by reference in their entirety. Further, the present disclosure may be used with a rearview packaging assembly, such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel, such as that described in U.S. Pat. Nos. 8,827,517; 8,210,695; and 8,201,800, which are hereby incorporated herein by reference in their entirety.

According to some aspects of the disclosure, a rearview assembly comprises an electrochromic element including a first substrate with a first surface and a second surface; a second substrate comprising a third surface and a fourth surface, wherein the first substrate and the second substrate form a cavity; and an electrochromic medium contained in the cavity. An image sensor can be directed toward the fourth surface and configured to capture near-infrared light reflected off of an object and transmitted through the electrochromic element. A transflective film disposed adjacent to the fourth surface has a near-infrared light transmission level and a visible light reflectance level, the near-infrared transmission level being at least 50%.

According to various aspects, the disclosure may implement one or more of the following features or configurations in various combinations:
- the near-infrared light transmission level is at least 80%;
- the visible light reflectance level is about 45%;
- a light source directed toward the fourth surface and configured to transmit the near-infrared light through the electrochromic element;
- the transflective film is an anisotropic polymer-based film;
- the transflective film includes at least 50 layers, wherein a consecutive pair of the at least 50 layers has different refractive indices;
- the first surface corresponds to a viewing side of the rearview assembly and the fourth surface is directed into a housing of the rearview assembly;
- a metallic layer having a visible light reflectance level greater than the visible light reflectance level of the transflective film;
- the metallic layer is disposed on the fourth surface between the second substrate and the transflective film; and/or
- the object is an eye of a user, and further wherein the near-infrared light reflected of the object is processed by a controller configured to determine an identity of the user based on the near-infrared light.

According to another aspect of the invention, a method for authenticating a passenger of a vehicle via a mirror assembly comprises emitting an emission of near-infrared light from a light source housed within the mirror assembly and transmitting at least 50% of the first emission through a polymer-based transflective film layer. The emission is transmitted through an electrochromic element. Visible light is received from a local environment of the mirror assembly and a portion of the visible light is transmitted through the electrochromic element. About 45% of the visible light is reflected from the polymer-based transflective film layer as a visible reflection. A near-infrared reflection of the emission is received as image data at an image sensor disposed in the mirror assembly, thus authenticating the passenger of the vehicle based on the image data.

According to various aspects, the disclosure may implement one or more of the following features or configurations in various combinations:
- transmitting the visible reflection through the electrochromic element and into the vehicle from a viewing surface of the mirror assembly;
- the near-infrared light transmission level is at least 80%;
- the transflective film is an anisotropic polymer-based film;
- transmitting the emission through the polymer-based transflective film layer includes transmitting the emission through at least 50 film layers including a consecutive pair of layers that has different refractive indices; and/or
- transmitting emission through a metallic layer following the transmission through the polymer-based transflective film layer and prior to the transmission through the electrochromic element.

According to yet another aspect of the invention, a scanning apparatus for a vehicle, the scanning apparatus comprises an electrochromic element including a first substrate comprising a first surface and a second surface. The second substrate comprises a third surface and a fourth surface, wherein the first substrate and the second substrate form a cavity. The first surface corresponds to a viewing side of the rearview assembly and the fourth surface is directed into a housing of the rearview assembly; and an electrochromic medium contained in the cavity. An image sensor is directed toward the fourth surface and configured to capture near-infrared light ranging from approximately 750 nm to 1200 nm reflected off of an eye of a passenger of the vehicle and projected through the electrochromic element. A transflective film is disposed adjacent to the fourth surface having a near-infrared light transmission level of about 80%. A controller is in communication with the image sensor and configured to determine an identity of the passenger based on the near-infrared light.

According to various aspects, the disclosure may implement one or more of the following features or configurations in various combinations:
- a light source directed toward the fourth surface and configured to transmit the near-infrared light through the electrochromic element;
- the transflective film is an anisotropic polymer-based film; and/or
- the transflective film includes at least 50 layers, wherein a consecutive pair of the at least 50 layers has different refractive indices.

It will be appreciated that embodiments of the invention described herein may be comprised of one or more conventional processors and unique stored program instructions that control one or more processors to implement, in conjunction with certain non-processor circuits, some, most, or all of the functions of a display mirror assembly 12, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview assembly comprising:
   an electrochromic element comprising:
   a first substrate comprising a first surface and a second surface;
   a second substrate comprising a third surface and a fourth surface, wherein the first substrate and the second substrate form a cavity; and
   an electrochromic medium contained in the cavity;
   an image sensor directed toward the fourth surface and configured to capture near-infrared light reflected off of an object and transmitted through the electrochromic element; and
   a transflective film disposed adjacent to the fourth surface having a near-infrared light transmission level and a visible light reflectance level, the near-infrared transmission level being at least 50% independent of polarization of the near-infrared light.

2. The rearview assembly according to claim 1, wherein the near-infrared light transmission level is at least 80%.

3. The rearview assembly according to claim 2, wherein the visible light reflectance level is about 45%.

4. The rearview assembly according to claim 1, further comprising:
   a light source directed toward the fourth surface and configured to transmit the near-infrared light through the electrochromic element.

5. The rearview assembly according to claim 1, wherein the transflective film is an anisotropic polymer-based film.

6. The rearview assembly according to claim 5, wherein the transflective film includes at least 50 layers, wherein a consecutive pair of the at least 50 layers has different refractive indices.

7. The rearview assembly according to claim 1, wherein the first surface corresponds to a viewing side of the rearview assembly and the fourth surface is directed into a housing of the rearview assembly.

8. The rearview assembly according to claim 1, further comprising:
   a metallic layer having a visible light reflectance level greater than the visible light reflectance level of the transflective film.

9. The rearview assembly according to claim 8, wherein the metallic layer is disposed on the fourth surface between the second substrate and the transflective film.

10. The rearview assembly according to claim 1, wherein the object is an eye of a user, and further wherein the near-infrared light reflected off the object is processed by a controller configured to determine an identity of the user based on the near-infrared light.

* * * * *